United States Patent
Brault et al.

(10) Patent No.: US 7,073,381 B2
(45) Date of Patent: Jul. 11, 2006

(54) ROTATION CONTROL SENSOR

(75) Inventors: Christophe Brault, Touvres (FR); Victorio Vedelago, Saint Yrieix (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 136 days.

(21) Appl. No.: 10/495,440

(22) PCT Filed: Nov. 20, 2002

(86) PCT No.: PCT/FR02/03959

§ 371 (c)(1),
(2), (4) Date: May 25, 2004

(87) PCT Pub. No.: WO03/046484

PCT Pub. Date: Jun. 5, 2003

(65) Prior Publication Data

US 2005/0072232 A1  Apr. 7, 2005

(30) Foreign Application Priority Data

Nov. 26, 2001 (FR) .................................. 01 15465

(51) Int. Cl.
*G01P 3/00* (2006.01)
*G01H 1/10* (2006.01)
(52) U.S. Cl. ........................................ 73/509; 702/151
(58) Field of Classification Search ................ 73/509, 73/514.09; 324/161, 167, 207.16, 207.2, 324/207.26; 702/151, 43, 145, 150, 88, 94
See application file for complete search history.

(56) References Cited

U.S. PATENT DOCUMENTS

| | | | |
|---|---|---|---|
| 5,895,441 A * | 4/1999 | Brault et al. | 702/85 |
| 6,594,615 B1 * | 7/2003 | Bernard et al. | 702/150 |
| 6,799,140 B1 * | 9/2004 | Bernard et al. | 702/151 |
| 6,879,165 B1 * | 4/2005 | Pitault et al. | 324/609 |

FOREIGN PATENT DOCUMENTS

| | | |
|---|---|---|
| DE | 199 27 759 | 1/2001 |
| EP | 1 130 403 | 9/2001 |

OTHER PUBLICATIONS

U.S. Appl. No. 09/793,581, filed Feb. 27, 2001, Bernard et al.
U.S. Appl. No. 10/495,440, filed May 25, 2004, Brault et al.

* cited by examiner

Primary Examiner—Helen Kwok
(74) Attorney, Agent, or Firm—Oblon, Spivak, McClelland, Maier & Neustadt, P.C.

(57) ABSTRACT

Rotation-monitoring detector comprising a binary output signal and a signaling LED, and including a frequency operating mode in which the state of the output signal and of the LED are a function of a passage frequency of a target in front of the detector. The detector includes a static operating mode in which the state of the LED is a function of a distance between the target and the detector. The detector comprises selection means, permitting the static mode and the frequency mode to be selected. The selection means are likewise used for the learning functions of the detector.

13 Claims, 1 Drawing Sheet

ROTATION CONTROL SENSOR

The present invention relates to a proximity detector of the inductive, capacitive, magnetic, or photoelectric type, or to a mechanical position switch used for monitoring rotation, particularly in the monitoring of under-speed or over-speed of a rotational movement.

BACKGROUND THE INVENTION

1. Field of the Invention

Rotation control detectors are frequently used in numerous industries for monitoring movement, slipping, conveyor belt breaks, belt breaks, etc. They unite, in the same device, conventional functions of detecting the presence of a target close to, or in contact with, the detector by means of a sensor element and functions of processing by counting the information received by the detector during a given time for comparison with, for example, a predetermined frequency of engagement of the device so as to deliver as an output a binary signal resulting from this comparison. An economical device is thus obtained, well suited to dealing with simple problems of under-speed and over-speed.

2. Description of the Related Art

The document EP 1130403 describes a rotation-monitoring detector, in front of which there passes a target whose frequency of passage is to be monitored with respect to a normal passage frequency. This detector comprises operator communication means constituted by a push button and an electroluminescent communication diode LED on the detector. The push button acts to place the detector in a working mode or in a learning mode. The learning mode permits the microcontroller of the detector to measure a normal passage frequency and permits selecting a range of detector functioning around this normal frequency. In the learning mode, the communication LED associated with the push button acts, for example, to guide the operator in the adjustment of the desired range of detector functioning. Furthermore, such a detector also generally comprises a display LED which is the image of the state of the output.

However, during the mounting of a rotation-monitoring detector, it is hardly practical to adjust the distance of the target in static mode so as to situate it in the range of the detector. For this, it would be quite effective to give the assembly operator, during the initial adjustment phase, information indicating to him whether or not the target is placed at a satisfactory distance within the range of the detector. There exist certain rotation-monitoring detectors which have for this purpose, as well as an LED to display an image of the frequency of passage of the target, another specific display LED whose state is a function of the distance between the target and the detector. However, this solution is expensive, because it requires a supplementary display component which is only used in the initial adjustment phase and which can furthermore result in excessive electric consumption in a small size device, particularly in a two-wire supply version.

BRIEF SUMMARY OF THE INVENTION

The present invention has as its object to remedy these disadvantages by proposing an economical solution which gives the operator information indicating to him, during the adjustment phase of the detector, whether the target is or is not situated in the range of the detector.

For this, the invention describes a rotation-monitoring detector delivering a binary output signal and having a signaling LED, the state of the binary output signal and of the signaling LED being a function, in a frequency operating mode, of the passage frequency of a target in front of the detector. The detector is characterized in that it has a static operating mode in which the state of the signaling LED is a function of the distance D between the target and the detector.

According to a characteristic, the state of the output signal, in the static mode, is a function of the distance D between the target and the detector.

According to another characteristic, the detector comprises selection means positioned in a first position or in a second position, permitting the selection of the static mode and the frequency mode. The selection means are likewise used for parameterizing the learning of the detector in frequency mode. Preferably, the selection means are constituted by a push button, the pressed state of which corresponds to the second position.

Other characteristics and advantages will become apparent from the following detailed description, referring to an exemplary embodiment represented by the accompanying drawings in which:

BRIEF DESCRIPTION THE FIGURES

DETAILED DESCRIPTION OF THE INVENTION

Figure 1:
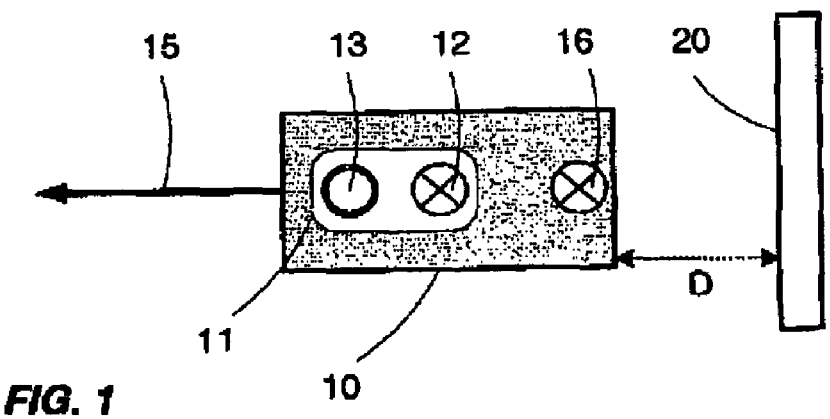
FIG. 1 shows a schematic view of a detector according to the invention.

Referring to FIG. 1, a detection device 10 is responsible for monitoring the frequency of passage of one or more targets 20 so as to detect an under-speed and/or an over-speed with respect to a normal passage frequency.

The detection device 10, termed "detector" in the present document, may equally be either an inductive, capacitive or magnetic proximity detector or a photoelectric cell monitoring the passage of a target situated at a distance D from the detector, or else a mechanical position switch monitoring the passage of a target situated in contact with the detector. The embodiment described hereinbelow corresponds to a proximity detector.

It is known that such a detector 10 comprises a sensor element, sensitive to the passage of the target 20 and constituting the information input of the detector 10. The sensor element emits a sensor signal, the state of which is a function of the distance of the target 20. This sensor signal is transmitted, via an amplifying and shaping stage, to a processing unit which processes it so as to deliver, through a power stage, a binary output signal 15 which can be either in the state 0 or in the state 1. In a use of the detector 10 as a rotation monitor, the binary output signal 15 is thus a function of the frequency of passage of the target in front of the detector, in frequency operating mode. For example, it may be envisaged that the output signal 15 is in state 1 when the passage frequency of the target 20 is greater than a given engagement frequency, and in state 0 if not, taking account of hysteresis. It can likewise be envisaged that the output signal 15 is in state 1 (or respectively state 0) when the passage frequency of the target 20 is comprised within an operating range around a given nominal passage frequency, and in state 0 (or respectively state 1) outside this range. The detector 10 also comprises a signaling LED 16, for example yellow in color, which is traditionally the image of the output 15.

Furthermore, the detector 10 for rotation monitoring comprises operator communication means 11 connected to the microcontroller and comprising a communication LED 12, for example green in color, as well as selection means 13 positioned in a first position or in a second position. The communication LED 12 is moreover frequently used to indicate the detector power supply.

The rotation-monitoring detector works according to a frequency operating mode 30 which includes two operating sub-modes: a working mode 31 and a learning mode 32. The working mode 31 corresponds to the usual operation of the detector 10 in which this monitors the passage of a target 20 and delivers a binary signal 15 which is a function of the passage frequency of this target 20. In the working mode 31, the signaling LED 16 is directly the image of the binary output 15, for example lit when the binary output 15 is in state 1. It may thus aid an operator close to the detector to verify the good operation of the detector.

The learning mode 32 permits performing the parameterization of the detector 10. This learning mode comprises the following phases, for example:
  measurement of a normal passage frequency, starting from a target passing in front of the detector at a reference speed,
  calculation of an engagement frequency and of a disengagement frequency from the normal measured passage frequency and from an operating range chosen by the operator.

To actuate the learning mode 32, then to parameterize the detector 10 in this learning mode 32 in order in particular to select the desired range of operation, the operator uses the selection means 13 and the communication LED 12, following an appropriate communication protocol, such as that described in the document EP 1130403.

Nevertheless, before performing learning of the detector 10, a first operation is necessary to ensure good positioning of the target 20, that is, to ensure that the distance D between the target 20 and the detector 10 is comprised in the range of the detector 10 when the target 20 passes in front of the detector 10. This adjustment operation is executed during the initial assembly of the detector, during positioning of a target 20, but also during periodic maintenance operations, etc.

If it is performed with the passage of a target 20 in rotation, the adjustment operation may become extremely dangerous because of the presence of moving parts close to the operator. It is thus highly desirable to execute this adjustment before any operation of the machine on which the detector 10 is fixed. But if the adjustment operation is performed at very low speed or at zero speed to avoid this danger, the integration time necessary for the detector 10 for calculating a speed and sending a corresponding signal is necessarily very long, which makes the adjustment of the range tedious. Furthermore, during this adjustment operation, the operator needs to have a rapid return of information indicating to him whether the target 20 is at a correct distance from the detector 10.

For this reason, the invention describes a detector 10 for rotation monitoring having the possibility of performing this adjustment by means of a supplementary operating mode called "static mode" 35. In this static mode 35, the state of the signaling LED 16 is no longer a function of the passage frequency of the target 20 past this, as in the working mode 31, but is uniquely a function of the position of the target 20 with respect to the detector 10, that is, the distance D between the target 20 and the detector 10. For example, the LED 16 is lit only if the distance D between the target 20 and the detector 10 is within the range of the detector 10. Thus an operator performing the adjustment of the detector 10 may directly visualize an item of information indicating to him whether the detector 10 (or the target 20) is correctly positioned, permitting the adjustment of the distance D to be very rapidly carried out.

In the static mode 35, the binary output 15 is generally a function of the distance D between the target 20 and the detector 10, thus behaving like the display LED 16, but can likewise remain a function of the passage frequency of the target 20, as in the frequency mode 30. In the first case, the static mode 35 is then similar to the operating mode of a conventional proximity detector not operating as a rotation monitor.

Advantageously, by manually or automatically varying the position of the target, the static mode 35 also permits verifying at any time, at the end of manufacture but also on site, that the detector 10 indeed has a hysteresis in the detection of range. This hysteresis is controlled by the builder and is necessary to minimize any risk of the sensor element rebounding at the moment of the rising or falling fronts of the target presence sensor signal. It is vital to verify this hysteresis because, when used as a rotation monitor, such a rebound would inevitably introduce an error into the counting and would thus generate a potentially erroneous output signal 15 of the detector 10.

Figure 2:
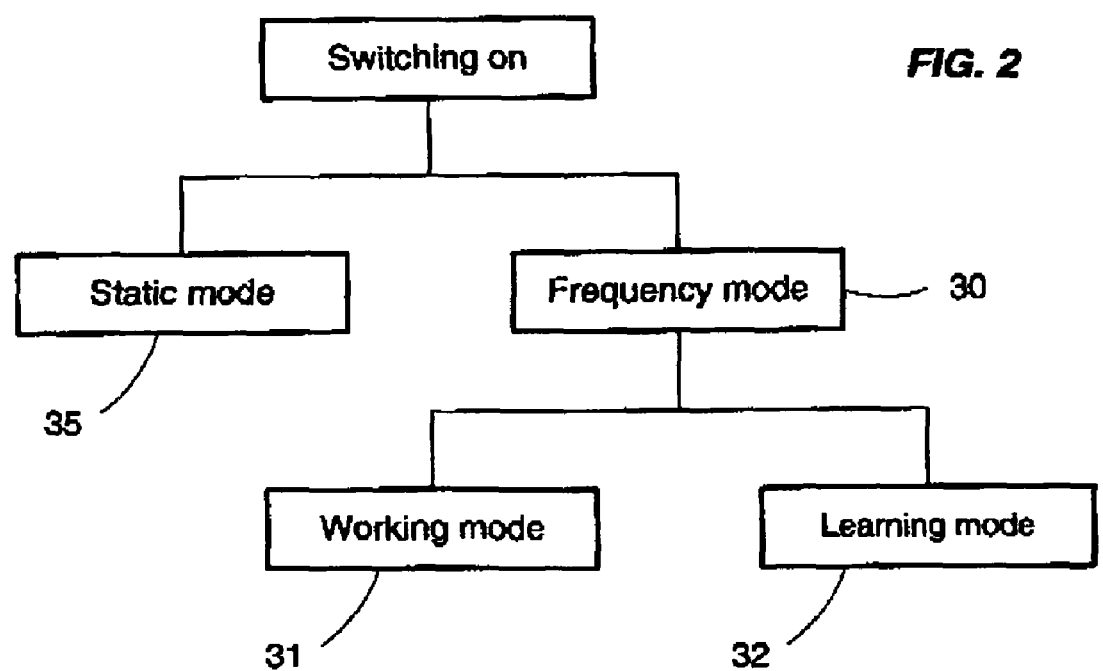
FIG. 2 shows the different modes of functioning of the detector.

As the static mode 35 and the learning mode 32 are never simultaneous, as indicated in FIG. 2, then according to the invention the operator communication means 11 used during the learning mode 32 is likewise used to select the static mode 35 or the frequency mode 30 without penalizing the functionalities of the detector 10. It is thus very economical to propose a static adjustment mode 35 such as described hereinabove in the rotation-monitoring detectors 10 already having a learning mode 32, since no addition of supplementary components is necessary. A considerable supplementary service for the operator is thus easily provided to aid him in setting up his installation.

In particular, the selection means 13 permit selecting the static mode 35 in the following manner:
  if the selection means 13 of the detector 10 are positioned in the first position at the switching on of the detector 10 (that is the moment of applying voltage to the detector 10), the frequency mode 30 (including the working mode 31 and the learning mode 32) is selected,
  if the selection means 13 of the detector 10 are positioned in the second position at the switching on of the detector 10, the static mode 35 is selected.

According to a first embodiment, the selection means are constituted by a simple push button 13 placed close to the communication LED 12, thus preserving a simple solution for the detector 10. The first position of the selection means corresponds to the relaxed, or non-active, state of the push button 13, and the second position corresponds to the pressed, or active, state of the push button 13.

In this embodiment, passing from the frequency mode 30 to the static mode 35 requires shutting off the power supply to the detector 10, then pressing the push button 13 and restoring the power supply to the detector 10. Vice versa, passing from the static mode 35 to the frequency mode 30 requires shutting off the power supply to the detector 10, then restoring the power supply to the detector 10 without pressing the push button 13. Once one of the static mode 35 or frequency mode 30 has been selected, the push button 13 has no influence on returning to the frequency 30 or static 35 mode, as long as the power supply to the detector 10 is not shut off. Because of the use of a push button, shutting off the power supply of the detector 10 during normal operation automatically places the detector by default in the frequency mode 30 corresponding to normal operation, since the push button 13 is by default in its relaxed position.

According to another embodiment, the selection means 13 are constituted by a two-position bistable switch. In this case, a proximity detector is obtained which has two distinct operating modes which are equally usable: if the switch is in a first position when voltage is applied, the detector operates in frequency mode as a rotation monitor with an output whose state is a function of the passage frequency of a target; if the switch is in a second position when voltage is applied, the detector operates in static mode as a conventional proximity detector with an output whose state is a function of the position of a target.

It is of course possible to imagine, without departing from the scope of the invention, other alternatives and improvements of detail, and to envisage the use of equivalent means.

The invention claimed is:

1. A rotation-monitoring detector comprising:
   a binary output signal;
   a signaling LED;
   a frequency operating mode in which a state of the binary output signal and a state of the signaling LED are a function of a passage frequency of a target in front of the detector; and
   a static operating mode in which the state of the signaling LED is a function of a distance between the target and the detector.

2. A rotation-monitoring detector according to claim 1, wherein in the static operating mode, the state of the output signal is a function of the distance between the target and the detector.

3. A rotation-monitoring detector according to claim 1, wherein in the static operating mode the signaling LED is lit when the distance of the target is within a range of the detector.

4. A rotation-monitoring detector according to claim 2, further comprising means for selecting positioned in a first position or in a second position, for permitting selection of the static operating mode and of the frequency operating mode.

5. A rotation-monitoring detector according to claim 3, further comprising means for selecting positioned in a first position or in a second position, for permitting selection of the static operating mode and of the frequency operating mode.

6. A rotation-monitoring detector according to claim 4, wherein the means for selecting is also used for parameterizing learning of the detector in the frequency operating mode.

7. A rotation-monitoring detector according to claim 5, wherein the means for selecting is also used for parameterizing learning of the detector in the frequency operating mode.

8. A rotation-monitoring detector according to claim 6, wherein the means for selecting includes a push button whose pressed state corresponds to a second position.

9. A rotation-monitoring detector according to claim 7, wherein the means for selecting includes a push button whose pressed state corresponds to a second position.

10. A rotation-monitoring detector according to claim 4, wherein the frequency operating mode is selected when the means for selecting is positioned in a first position during switching on of the detector.

11. A rotation-monitoring detector according to claim 7, wherein the frequency operating mode is selected when the means for selecting is positioned in a first position during switching on of the detector.

12. A rotation-monitoring detector according to claim 10, wherein the static operating mode is selected when the means for selecting is positioned in a second position during the switching on of the detector.

13. A rotation-monitoring detector according to claim 11, wherein the static operating mode is selected when the means for selecting is positioned in a second position during the switching on of the detector.

* * * * *